United States Patent
Kuwana

(10) Patent No.: US 7,852,007 B2
(45) Date of Patent: Dec. 14, 2010

(54) AUTOMOBILE ROOM LAMP SYSTEM

(75) Inventor: Isamu Kuwana, Kawagoe (JP)

(73) Assignee: Kabushiki Kaisha T An T, Kawagoe-Shi (JP)

( * ) Notice: Subject to any disclaimer, the term of this patent is extended or adjusted under 35 U.S.C. 154(b) by 461 days.

(21) Appl. No.: 12/047,587

(22) Filed: Mar. 13, 2008

(65) Prior Publication Data

US 2008/0231193 A1    Sep. 25, 2008

(30) Foreign Application Priority Data

Mar. 22, 2007    (JP)    ............................. 2007-075307

(51) Int. Cl.
*B60Q 1/14*    (2006.01)
(52) U.S. Cl. ............................. 315/77; 315/83; 315/84; 315/224
(58) Field of Classification Search .................. 315/77, 315/82–84, 178, 209 R, 224–226; 307/10.1, 307/10.8
See application file for complete search history.

(56) References Cited

U.S. PATENT DOCUMENTS

| | | | | |
|---|---|---|---|---|
| 4,071,805 A | * | 1/1978 | Brock | ......................... 315/84 |
| 5,903,104 A | * | 5/1999 | Kojima | ......................... 315/82 |
| 5,998,928 A | * | 12/1999 | Hipp | ............................ 315/77 |
| 6,329,755 B1 | * | 12/2001 | Nakade et al. | ................ 315/82 |
| 6,621,224 B2 | * | 9/2003 | Umezawa et al. | ............. 315/82 |
| 7,180,247 B2 | * | 2/2007 | Kawarazaki | ............ 315/209 R |

FOREIGN PATENT DOCUMENTS

JP    3660267    10/2002

* cited by examiner

*Primary Examiner*—Douglas W Owens
*Assistant Examiner*—Tung X Le
(74) *Attorney, Agent, or Firm*—Nixon & Vanderhye P.C.

(57) ABSTRACT

An automobile room lamp system is provided, which comprises a first circuit having a power source with positive and negative poles, a light emitting diode, a miniature incandescent bulb and a push switch, said light emitting diode, said miniature incandescent bulb and said push switch being connected in series between said positive pole and said negative pole; and a second circuit branching off from said first circuit between said light emitting diode and said miniature incandescent bulb and having a resistor provided on a negative pole side of said poser source, said resistor having a resistance value set at a level to allow said light emitting diode and said miniature incandescent bulb to be lighted with a high intensity when said push switch is closed and to allow said light emitting diode alone to issue dim light when said push switch is opened.

8 Claims, 4 Drawing Sheets

AUTOMOBILE ROOM LAMP SYSTEM

This application claims priority to Japanese Patent Application No. 2007- 75307 filed Mar. 22, 2007, the entire contents of which are hereby incorporated by reference.

BACKGROUND OF THE INVENTION

The present invention relates to an automobile room lamp system and particularly to an automobile room lamp system mountable to a roof portion between the driver's seat and the front passenger's seat in an automobile and serving as a preferable illumination light for studying a map.

The invention also aims at improving the illumination effect in the whole automobile room.

Conventionally, incandescent light bulbs have been used for interior illumination of the vehicle, which however are being replaced by light emitting diodes (LEDs).

In the automobile room lamp system equipped with conventional light emitting diodes, for example, a 12-volt battery, a light emitting diode (LED), a limited current resistor and a door switch are connected in series, in which the electric resistance of said limited current resistor is set at a value such that a current of a predetermined value flows through the light emitting diode. (See Official Gazette of Japanese Patent No. 3660267)

The conventional automobile room lamp system has a problem that the illumination performance is very poor as a result of power loss due to voltage drop because the light emitting diode (LED) is lighted by the current flowing from the battery through the limited current resistor.

Further, the limited diffusion of the illumination light due to its high directivity merely serves for spotlighting.

In other words, while such illumination is satisfactory for consulting a map, it fails to meet the user's needs for the effect of the automobile room lamp system to make the whole interior of the automobile brighter.

SUMMARY OF THE INVENTION

The present invention is made to solve the above-described problem by providing an automobile room lamp system which is capable of making the spotlight illumination by use of the directivity of lights from the light emitting diodes as well as making the wide range illumination of the interior of the automobile room by the effective use of the power source.

The object of the present invention is to realize the above-described object by an automobile room lamp system, the means of which comprises, as claim 1 recites, a first circuit having a power source with positive and negative poles, a light emitting diode (LED), a miniature incandescent bulb and a push switch, said light emitting diode (LED), said incandescent miniature bulb and said push switch being connected in series between said positive pole and said negative pole; and a second circuit branching off from said first circuit between said light emitting diode (LED) and said miniature incandescent bulb and having a resistor therein, said poser source, said resistor having a resistance value set at a level to allow said light emitting diode (LED) and said miniature bulb to be lighted with a high intensity when said push switch is closed and to allow said light emitting diode (LED) alone to give off dim light when said push switch is opened.

Claim 2 recites, in addition to the requirements of claim 1, that said push switch is provided with a first fixed contact and a second fixed contact, said first fixed contact being grounded, said second fixed contact being connected to a door switch adapted to takes ON and OFF positions by opening and closing doors, said door switch being grounded.

Claim 3 recites in addition to the requirements of claim 1, that said light emitting diode is connected to a short-circuiting switch at both terminal thereof.

Claim 4 recites in addition to the requirements of claim 1, that said light emitting diode and said power source have a non-lighting switch connected therebetween.

Claim 5 recites, in addition to the requirements of claim 4, that said non-lighting switch is adapted to take an OFF position when it is bright in the automobile room from external light during the daytime.

Claim 6 recites in addition to the requirements of claims 1 through 4, that said light emitting diode Includes a white light emitting diode.

Claim 7 recites, in addition to the requirement of claim 1, that said resistor has a 100-fold resistance value of said miniature incandescent bulb.

Claim 8 recites, in addition to the requirements of claim 1, that said light emitting diode is adapted to be lighted with a high intensity to produce a brightness sufficient to function as a map lamp.

DETAILED DESCRIPTION OF PREFERRED EMBODIMENTS

The Best Mode to Put the Invention into Practice

The automobile room lamp system of the present invention comprises a first circuit having a power source with positive and negative poles, a light emitting diode (LED), a miniature incandescent bulb and push switch between the positive pole and the ground in the form of a series circuit while a resistor is provided in a parallel circuit branching off from the first circuit between said light emitting diode (LED) and said incandescent miniature bulb to be connected to be grounded.

Example 1

Hereinafter, the first embodiment of the automobile room lamp system according to the present invention will be explained with reference to FIG. 1. In this connection, it is to be noted that the automobile room lamp system in the respective embodiments not to mention the first embodiment incorporate two parallel circuits with respect to the power source for the driver's seat and the front passenger's or four parallel circuits with respect to the power source for the driver's seat, the front passenger's seats and the two rear passenger's right and left seats.

Figure 1:
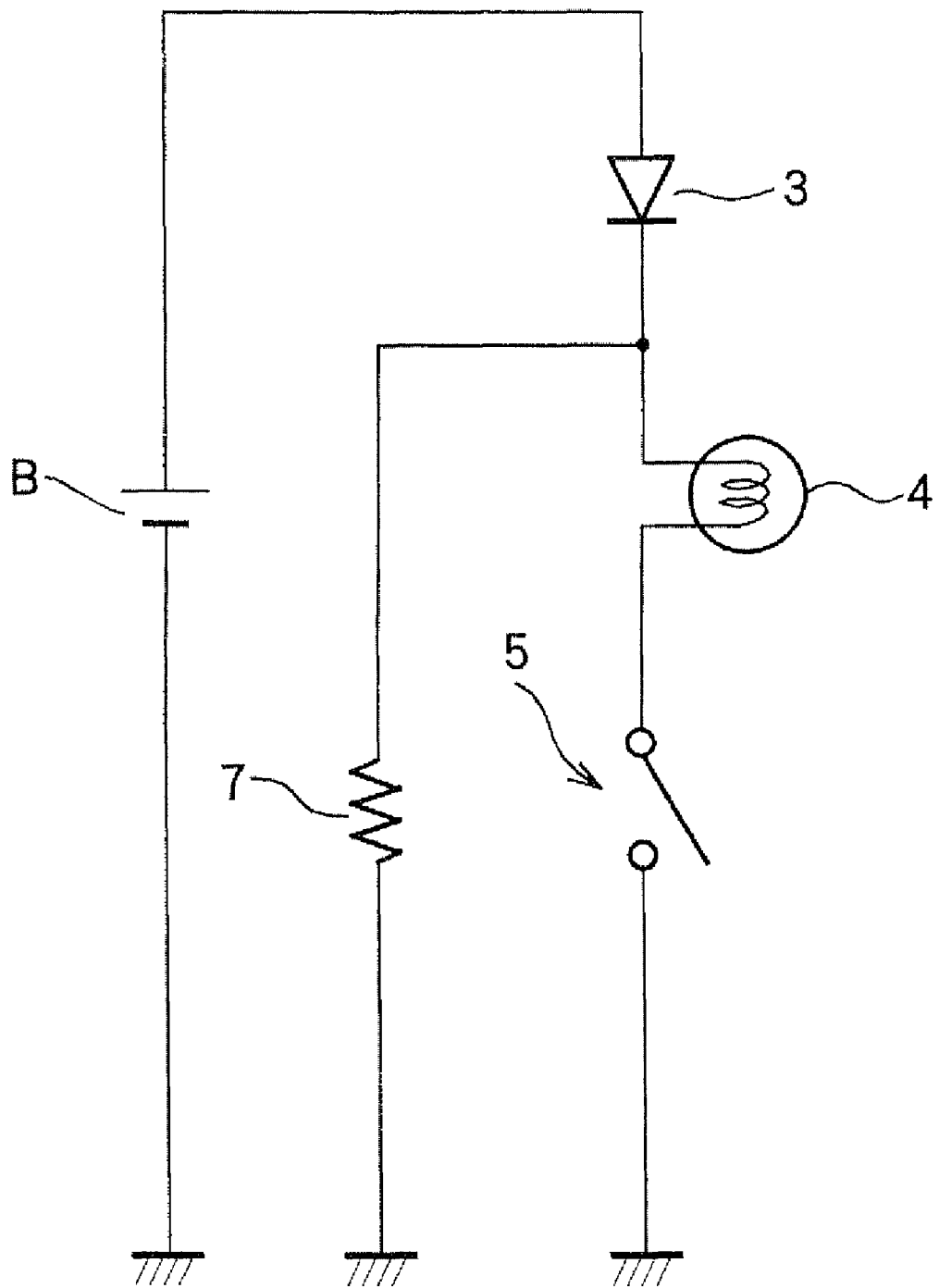
FIG. 1 is a circuit diagram of the structure of the automobile room lamp system of the first embodiment of the present invention.

Referring to FIG. 1, the automobile room lamp system incorporates a first circuit with a white light emitting diode 3 having an anode connected to the positive pole of a power source B for example twelve (12) volt battery, a miniature incandescent bulb 4 having one terminal connected to a cathode of the white light emitting diode 3, a push switch connected between said miniature incandescent bulb 4 and the earth, and a second circuit branching off from The first circuit 5 between said light emitting diode 3 and said miniature bulb 4 and having a resistor 7 having one end connected to said first circuit and the other end to the earth.

The resistance value of said resistor 7 is set at a level to allow the white light emitting diode 3 to give off a dim light when the push switch 5 is thrown to take the OFF position and said white light emitting diode 3 and said miniature bulb 4 to be lighted with a high intensity when said push switch 5 is thrown to take the ON position. As one specific example, the resistance of the miniature incandescent bulb 4 is 50Ω while that of the resister 7 is 5KΩ, which is 100-folds of the miniature incandescent bulb 4. In this way, the resistance value of the resistor is set at a level to allow the light emitting diode (LED) 3 and the miniature incandescent bulb 4 to be lighted with a high intensity when the push switch 5 is closed and to allow the light emitting diode 3 alone to give off a dim light when the push switch is open.

Therefore, when the push switch 5 is closed, a current from the power source B flows through the white light emitting diode (LED) 3 and the miniature incandescent bulb 4 while it flows through the white light emitting diode 3 and the resistor 7. However, since the resistance value of the resistor 7 is much larger than that of the miniature incandescent bulb 4 as mentioned above, the current from the power source B flows through the white light emitting diode 3 and the miniature incandescent bulb 4 to be grounded such that the white light emitting diode 3 and the miniature incandescent bulb 4 are lighted with a high intensity.

On the other hand, when the push switch 5 is opened, the current from the power source B flows through the white light emitting diode 3 and the resister 7 to be grounded. Since the resistance value of the resistor 7 is large, the current flows through only with a low intensity to give off dim light. Therefore, the optimum illumination is obtained with an intensity which will not interfere with the driving operation when it is dark in the automobile room at night while the dim light effects illumination into a specific direction; that is, an optimum illumination primarily to the push switch 5 to make it easy to locate the same.

Figure 2:
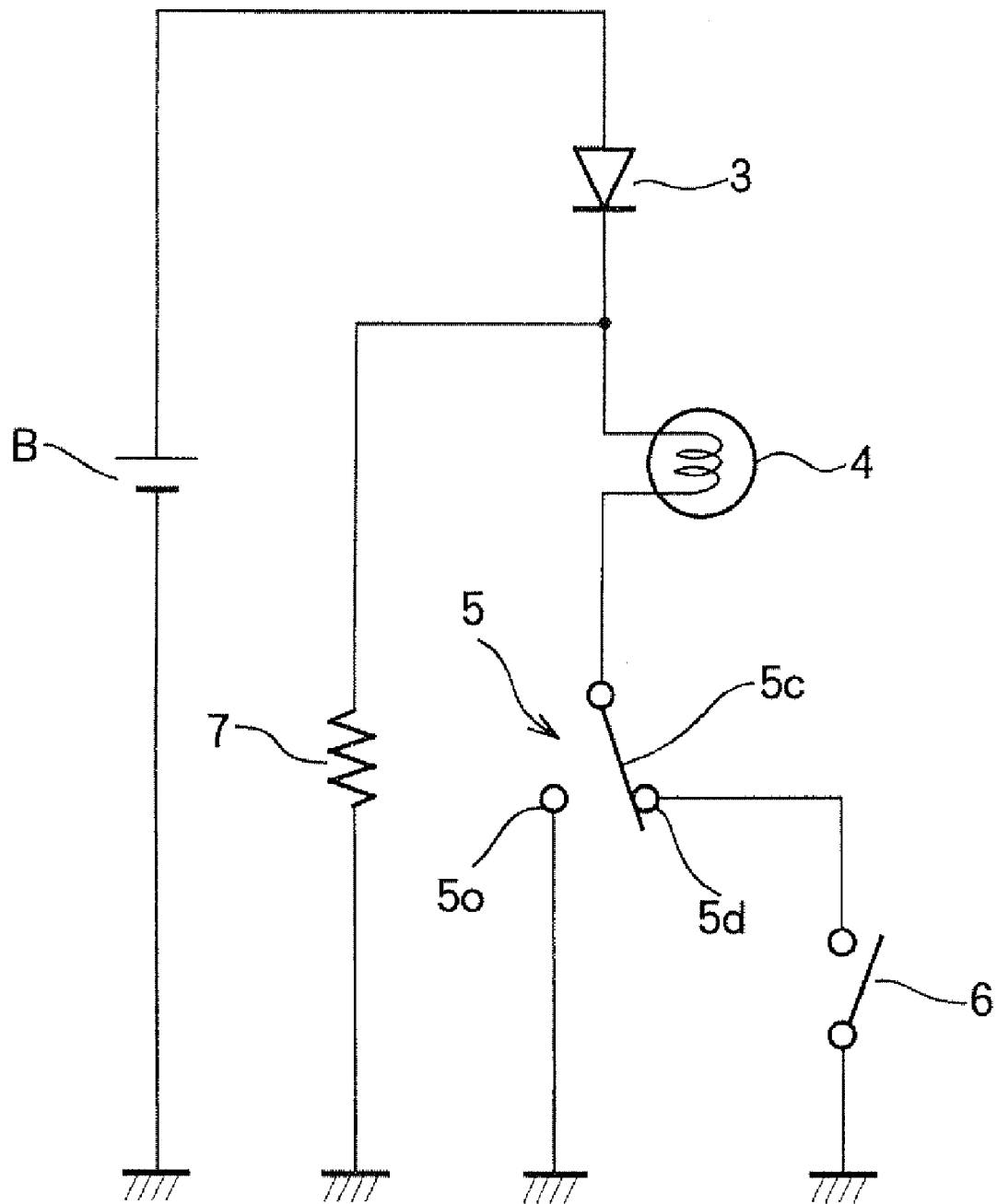
FIG. 2 is a circuit diagram of the structure of the automobile room lamp system of the second embodiment of the present invention.

Next, the second embodiment will be explained with reference to FIG. 2, which is different from the first embodiment in that there is provided a switch 5 composed of one traveling contact 5c and two fixed contact 5o and 5d relative to said traveling contact 5c, said fixed contact 5o being grounded, said fixed contact 5d being connected to one end of a door switch 6 adapted to take the ON position when a door is opened and the OFF position when the door is closed, the other end of said switch 6 being grounded.

When the traveling contact 5c of the push switch 5 is thrown to the fixed contact 5d with the door switch 6 taking the ON position (that is to say, the door is open), a current from the power source B flows through the white light emitting diode (LED) 3, the miniature incandescent bulb 4, the push switch 5 and the door switch 6 such that the white light emitting diode 3 and the miniature incandescent bulb 4 are lighted with a high intensity.

It is to be noted that when the door switch 6 takes the OFF position with the door being closed, said ON and OFF actions of the push switch 5 are the same as those explained with reference to the first embodiment. Therefore, the explanation of these actions is omitted but are shown in Table 1. In this way, the whole interior of the automobile room is lighted bright by this room lamp system.

TABLE 1

| PUSH SWITCH 5 | DOOR SWITCH 6 | WHITE LED 3 | MINI BULB 4 |
|---|---|---|---|
| DOOR TERMINAL 5d SIDE | OFF | ◯ | X |
| | ON | ◉ | ◉ |
| ON TERMINAL 5o SIDE | OFF | ◉ | ◉ |
| | ON | ◉ | ◉ |

◯: DIM LIGHT
X: LIGHT OFF
◉: LIGHT ON

As described in the foregoing with reference to the first and second embodiments of the present invention, the miniature incandescent bulb 4 and the resistor 7 connected in parallel each other are connected to the while light emitting diode (LED) 3 in series to light the white light emitting diode (LED) 3 together with the miniature incandescent bulb 4 such that extensive illumination of the interior of the room is obtained with the effective use of electric power from the power source B.

Further, since use of the white light emitting diode 3 for an LED enables white spot illumination to a specific location in the interior of the room, said white light emitting diode serves as a map lamp.

Figure 3:
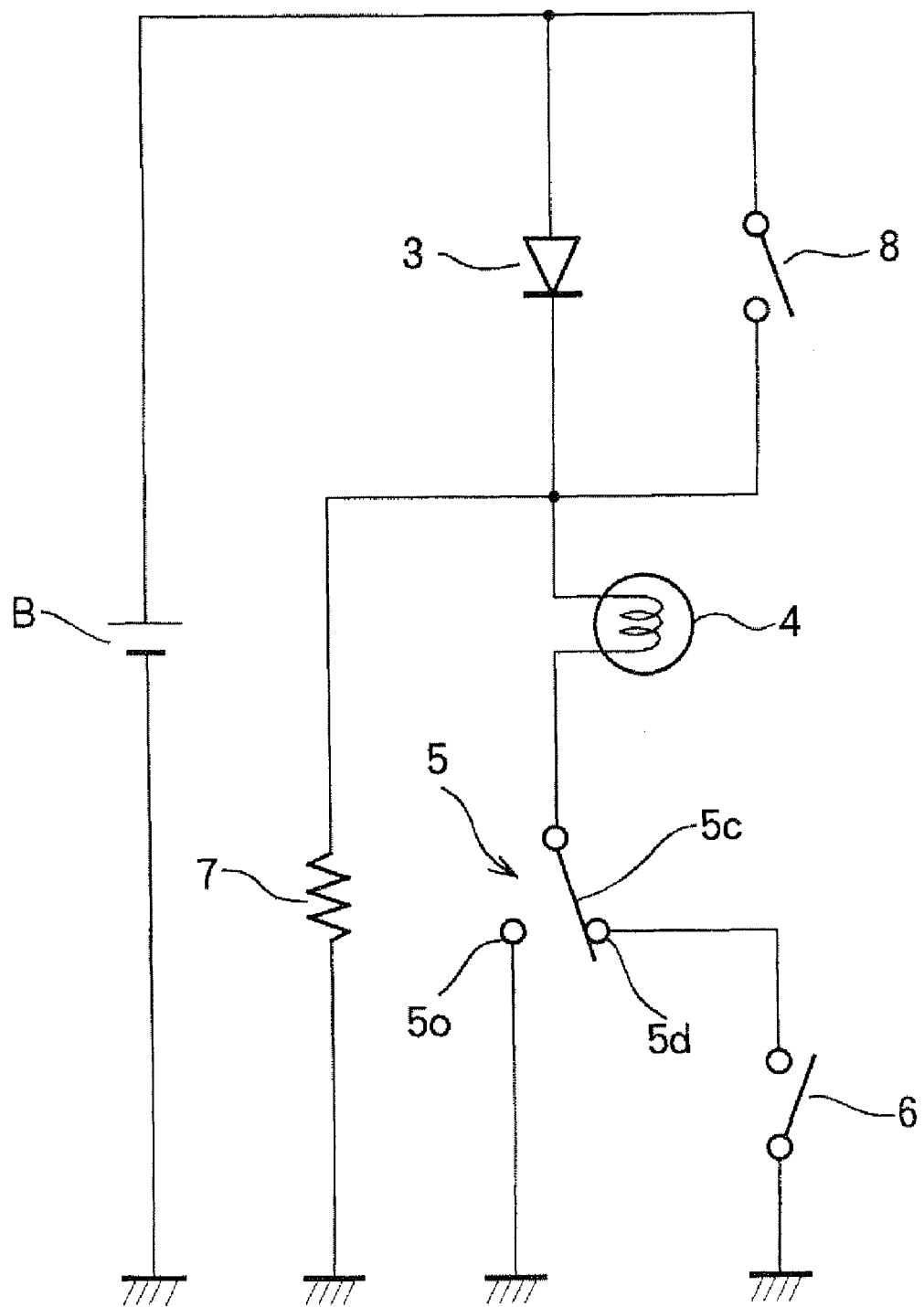
FIG. 3 is a circuit diagram of the structure of the automobile room lamp system of the third embodiment of the present invention.

FIG. 3 shows the third embodiment, which is a modification of the second embodiment.

This embodiment is different from the second embodiment in that a short-circuiting switch 8 is provided in parallel to said white light emitting diode 3. When the short-circuiting switch 8 is thrown to take the ON position, said white light emitting diode ceases to be lighted. In other words, said white light emitting diode (LED) will never be lighted no matter what positions the push switch 5 and the door switch 6 are caused to take, the miniature incandescent bulb alone being turned ON and Off, thus obtaining the conventional automobile room illumination by use of the miniature incandescent bulb 4.

Figure 4:
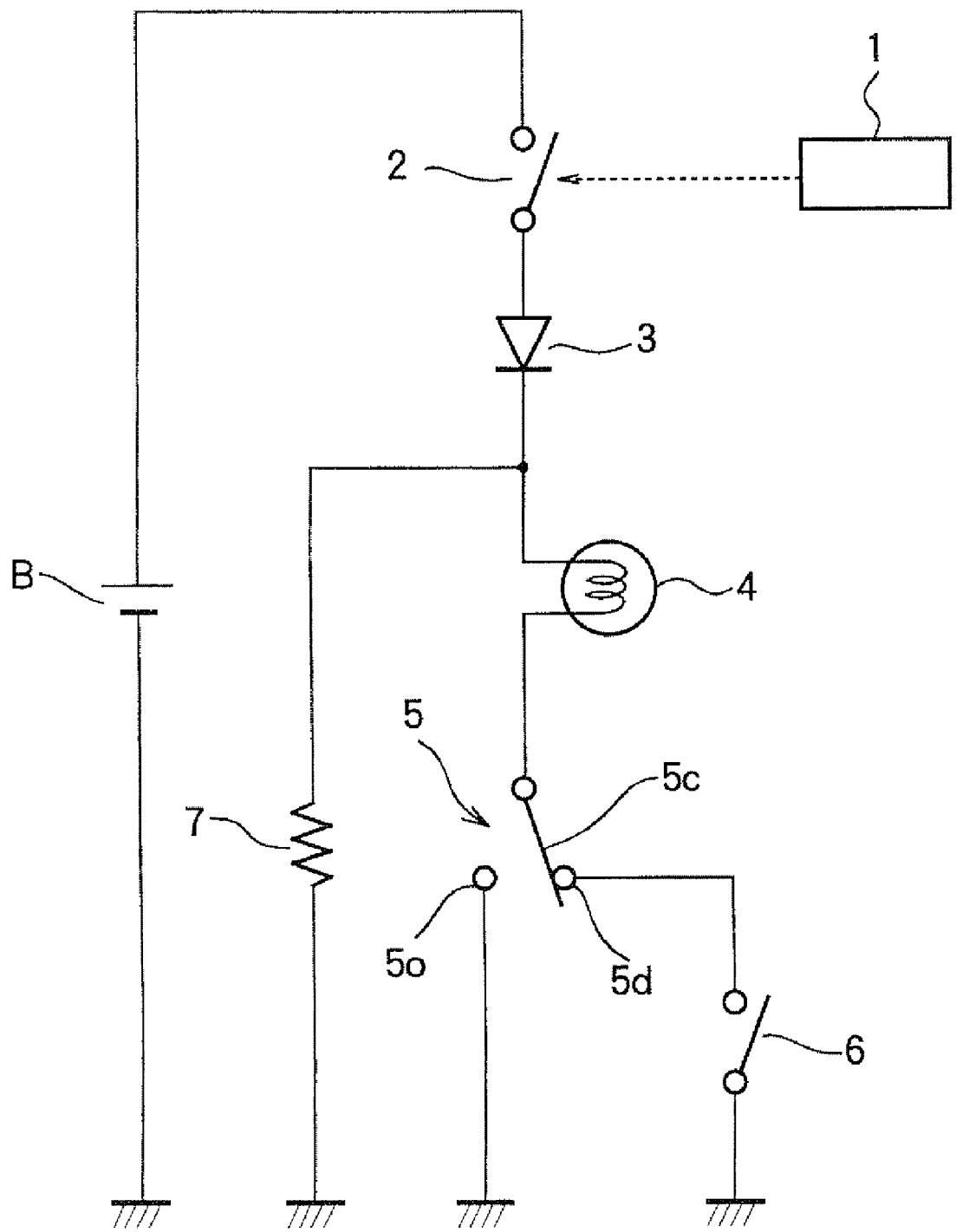
FIG. 4 is a circuit diagram of the structure of the automobile room lamp system of the fourth embodiment of the present invention.

Further, FIG. 4 shows the fourth embodiment of the present invention, which is a modification of the second embodiment.

In the drawing, the numeral 1 denotes a luminance meter to detect the brightness of the interior of the automobile room, which operates to issue an output when the dimness reaches a predetermined level so as to bring a non-lighting switch 2 to the ON position, said non-lighting switch 2 being connected between the power source B and the white light emitting diode.

When the interior of the automobile room is bright enough during the day time, no output is issued by the luminance meter 1, said non-lighting switch 2 takes the OFF position. Under this circumstances, even if the door switch 6 takes the ON position and no matter what position the traveling contact 5c of the push switch 5 takes, the white light emitting diode 3 and the miniature bulb 4 will not be lighted, thus preventing unnecessary illumination and waste of electric power of the power source B. In this connection, it is explained that said non-lighting switch 2 is controlled by the output from the illumination meter 1 in the foregoing embodiment, the actuation of said non-lighting switch 2 may be manually controlled.

As described in the foregoing, since the automobile room lamp system of the present invention incorporates the light emitting diode (LED), the miniature incandescent bulb and the push switch connected in series with respect to a power source such that said light emitting diode (LED) and said miniature incandescent bulb is lighted with a high intensity when thrown to take the ON position, it is possible to effectively illuminate the whole interior of the automobile room and to use said light emitting diode as a map lamp without causing power loss as observed in the conventional limited current resistor. Further, it is possible to provide a more effective map lamp by choosing a white light emitting diode for said light emitting diode.

Further, said light emitting diode is caused to give off dim light by throwing the push switch to the OFF position to stop the current thought the miniature incandescent lamp while the current is allowed to flow only through said light emitting diode B and said resister 7, thus producing a dim illumination to a specific location. For example, the push switch is quickly located due to the dim LED light.

Further, when the push switch 5 is thrown to the door switch side while the door switch 6 connected to the fixed contact 5d of the push switch 5 is thrown to take the OFF position, said light emitting diode alone is caused to give off dim light. On the other hand, the light emitting diode and the miniature incandescent lamp are lighted with a high intensity when the push switch 5 is thrown to the door switch side and the door switch 6 is caused to take the ON position. Therefore, it is possible to illuminate the whole interior of the automobile room as if the door is opened in the conventional structure and it is possible to cause the light emitting diode and the miniature incandescent bulb to be lighted with a high intensity by throwing the push switch 5 to the grounding side, thus making the room lamp system serve both as a map lamp and for whole room illumination.

Further, if the short-circuit switch 8 is connected in parallel with the light emitting diode 3, the miniature incandescent bulb 4 alone is lighted when the short-circuit switch is thrown to take the ON position.

Further, the provision of the non-lighting switch 2 between said light emitting diode 3 and the positive pole of said power source B can serve to save the consumption of energy from the power source if it is not required to illuminate the interior of the automobile room, for example, when it is bright enough during the daytime. Since said non-lighting switch is actuated by the luminance meter to be thrown to take the OFF position at a level higher than a predetermined brightness, it is possible to bring the automobile room lamp system into a functioning mode or a non-functioning mode.

What is claimed is:

1. An automobile room lamp system which comprises,
   a first circuit having a power source with positive and negative poles, a light emitting diode, a miniature incandescent bulb and a push switch, said light emitting diode, said miniature incandescent bulb and said push switch being connected in series between said positive pole and said negative pole; and
   a second circuit branching off from said first circuit between said light emitting diode and said miniature incandescent bulb and having a resistor provided therein, said resistor having a resistance value set at a level to allow said light emitting diode and said miniature incandescent bulb to be lighted with a high intensity when said push switch is closed and to allow said light emitting diode alone to issue dim light when said push switch is opened.

2. An automobile room lamp system according to claim 1, wherein said push switch is provided with a first fixed contact and a second fixed contact, said first fixed contact being grounded, said second fixed contact being connected to a door switch adapted to takes ON and OFF positions by opening and closing automobile doors, said door switch being grounded.

3. An automobile room lamp system according to claim 1, wherein said light emitting diode is connected to a short-circuiting switch at both terminals thereof.

4. An automobile room lamp system according to claim 1, wherein said light emitting diode and said power source have a non-lighting switch connected therebetween.

5. An automobile room lamp system according to claim 4, wherein said non-lighting switch is adapted to take an OFF position when it is bright enough in the automobile room from external light during the daytime.

6. An automobile room lamp system according to claim 1, wherein said light emitting diode includes a white light emitting diode.

7. An automobile room lamp system according to claim 1, wherein said resistor has a 100-fold resistance value of said miniature incandescent bulb.

8. An automobile room lamp system according to claim 1, wherein said light emitting diode is adapted to be lighted with a high intensity to produce a brightness sufficient to function as a map lamp.

* * * * *